(12) United States Patent
He et al.

(10) Patent No.: US 10,126,544 B2
(45) Date of Patent: Nov. 13, 2018

(54) DISPLAY PANEL

(71) Applicant: BOE TECHNOLOGY GROUP CO., LTD., Beijing (CN)

(72) Inventors: Xiaolong He, Beijing (CN); Zhanfeng Cao, Beijing (CN); Qi Yao, Beijing (CN); Bin Zhang, Beijing (CN); Zhengliang Li, Beijing (CN); Wei Zhang, Beijing (CN); Tingting Zhou, Beijing (CN); Jincheng Gao, Beijing (CN); Jiushi Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/525,445

(22) PCT Filed: Jul. 22, 2016

(86) PCT No.: PCT/CN2016/091037
§ 371 (c)(1),
(2) Date: May 9, 2017

(87) PCT Pub. No.: WO2017/128652
PCT Pub. Date: Aug. 3, 2017

(65) Prior Publication Data
US 2018/0039071 A1    Feb. 8, 2018

(30) Foreign Application Priority Data

Jan. 27, 2016  (CN) .......................... 2016 1 0055837

(51) Int. Cl.
*G02B 26/00*  (2006.01)
(52) U.S. Cl.
CPC ......... *G02B 26/005* (2013.01); *G02B 26/007* (2013.01)

(58) Field of Classification Search
CPC .................................................... G02B 26/005
(Continued)

(56) References Cited

U.S. PATENT DOCUMENTS

| 8,059,328 B1 * | 11/2011 | Kuo ..................... G02B 26/005 |
| | | 359/290 |
| 8,654,428 B2 | 2/2014 | Tian |

(Continued)

FOREIGN PATENT DOCUMENTS

| CN | 102411203 A | 4/2012 |
| CN | 102650733 A | 8/2012 |

(Continued)

OTHER PUBLICATIONS

International Search Report of PCT/CN2016/091037 in Chinese, dated Nov. 2, 2016 with English translation.

(Continued)

*Primary Examiner* — James Jones
(74) *Attorney, Agent, or Firm* — Collard & Roe, P.C.

(57) ABSTRACT

A display panel includes a first substrate and a second substrate which are arranged opposed to each other. The space between the first substrate and the second substrate is separated into a plurality of sub-pixel regions. Within each sub pixel region, a first electrode, a first fluid layer, a second fluid layer, a hydrophobic dielectric layer and a second electrode are arranged in this order. The first fluid layer is made of hydrophilic liquid. The second fluid layer is made of ink. When no electric field is applied between the first electrode and the second electrode, the ink spreads over the surface of the hydrophobic dielectric layer. When an electric field is applied between the first electrode and the second electrode, the ink aggregates to expose the hydrophobic dielectric layer.

19 Claims, 3 Drawing Sheets

(58) Field of Classification Search
USPC .......................................................... 359/290
See application file for complete search history.

(56) References Cited

U.S. PATENT DOCUMENTS

| | | |
|---|---|---|
| 9,075,281 B2 | 7/2015 | Kato et al. |
| 2008/0297030 A1 | 12/2008 | Zhang et al. |

FOREIGN PATENT DOCUMENTS

| | | |
|---|---|---|
| CN | 103998529 A | 8/2014 |
| CN | 104570326 A | 4/2015 |
| CN | 105511073 A | 4/2016 |

OTHER PUBLICATIONS

Notice of Transmittal of the International Search Report of PCT/CN2016/091037 in Chinese, dated Nov. 2, 2016.
Written Opinion of the International Searching Authority of PCT/CN2016/091037, dated Nov. 2, 2016 in Chinese with English translation.
Chinese Office Action in Chinese Application No. 201610055837.5, dated Dec. 21, 2016 with English translation.

* cited by examiner

DISPLAY PANEL

CROSS REFERENCE TO RELATED APPLICATIONS

This application is the National Stage of PCT/CN2016/091037 filed on Jul. 22, 2016, which claims priority under 35 U.S.C. § 119 of Chinese Application No. 201610055837.5 filed on Jan. 27, 2016, the disclosure of which is incorporated by reference.

TECHNICAL FIELD

Embodiments of the present invention relate to the field of display technology, more specifically, to a display panel.

BACKGROUND

EWOD (Electro Wetting on Dielectric) refers to the technology that the voltage applied between liquid and a solid electrode is adjusted to vary the surface tension of the liquid on the surface of the solid electrode so as to change the contact angle between them. In recent years, the droplet driving and controlling technology based on EWOD has drawn extensive attention and been applied in the flat-panel display field.

Currently, the EWOD display technology could mainly be classified into reflective type and passive light-emitting type. In the reflective-type EWOD display technology, the black ink covering the white reflective electrode contracts or extends under the control of voltage, thereby controlling the gray scale so as to implement black-and-white display; or, an additional color filter is involved to cooperate with the black ink so as to implement color display.

However, without the color filter, the reflective-type EWOD display technology in the prior art could only implement black-and-white display, so the display effect is extremely limited. And color display needs additional color filter and thus the structure is complex, thereby limiting further improvement of the reflective-type EWOD display technology.

SUMMARY

An embodiment of the present invention provides a display panel, comprising a first substrate and a second substrate which are arranged opposed to each other, wherein a space between the first substrate and the second substrate is separated into a plurality of sub-pixel regions; wherein a first electrode, a first fluid layer, a second fluid layer, a hydrophobic dielectric layer and a second electrode are arranged in this order within each sub-pixel region; the first fluid layer is made of hydrophilic liquid; the second fluid layer is made of ink; when no electric field is applied between the first electrode and the second electrode, the ink spreads over a surface of the hydrophobic dielectric layer; when the electric field is applied between the first electrode and the second electrode, the ink aggregates to expose the hydrophobic dielectric layer.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For clarity, the sizes of the elements illustrated in drawings according to embodiments of the present invention have been enlarged and do not represent actual thickness and scale.

Figure 1:
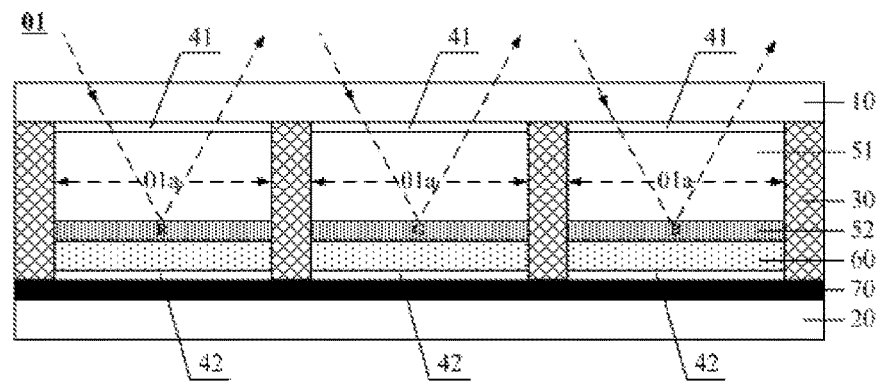
FIG. 1 schematically illustrates a partial cross-section of a display panel provided by an embodiment of the present invention.
Figure 2:
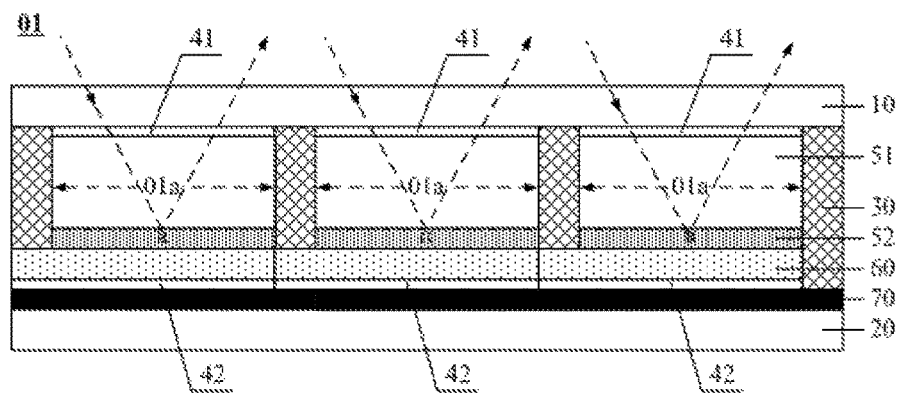
FIG. 2 schematically illustrates a partial cross-section of another display panel provided by an embodiment of the present invention.
Figure 3:
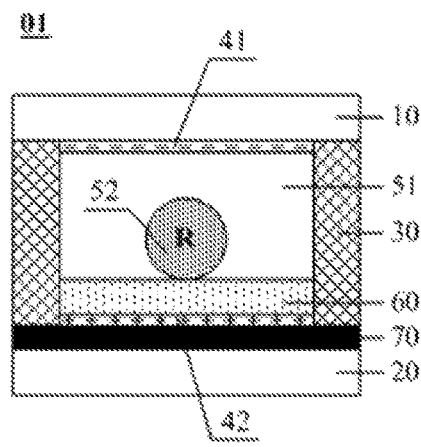
FIG. 3 schematically illustrates aggregation of the second fluid layer within a sub-pixel region of the display panel of FIG. 1 under an effect of the electric field.

As illustrated in FIG. 1 and FIG. 2, an embodiment of the present invention provides a display panel 01 comprising a first substrate 10 and a second substrate 20 which are arranged opposed to each other. The first substrate 10 is made of, for example, transparent material. The display panel 01 further comprises a plurality of pixel-separating walls 30 between the first substrate 10 and the second substrate 20 which divide the space between the first substrate 10 and the second substrate 20 into a plurality of sub-pixel regions 01a. Within any one of the sub-pixel regions 01a, a first electrode 41, a first fluid layer 51, a second fluid layer 52, a hydrophobic dielectric layer 60, a second electrode 42 and a black light-absorption layer 70 are arranged from top to bottom in the space between the first substrate 10 and the second substrate 20. For example, the first electrode 41 is made of transparent conductive material; the first fluid layer 51 is made of transparent hydrophilic liquid (e.g., water); and the second fluid layer 52 is made of reflective color ink. When no electric field is applied between the first electrode 41 and the second electrode 42, the second fluid layer 52 spreads over the surface of the hydrophobic dielectric layer 60; as illustrated in FIG. 3, when the electric field is applied between the first electrode 41 and the second electrode 42, the second fluid layer 52 aggregates and exposes the hydrophobic dielectric layer 60.

The display panel illustrated above may be, for example, reflective-type EWOD display panel. In the above display panel, the light incidents on and passes through the first substrate 10, the color ink reflects the ambient light to display images, and then the light exits from the first substrate 10, so the first electrode 41 and the first substrate 10 are both of transparent (i.e., light transmissible) in at least some of the embodiments.

For example, the first electrode 41 is made of at least one of the transparent conductive materials such as Indium Tin Oxide (ITO), Indium Tin Oxide (IZO), Fluorine-Doped Tin Oxide (FTO) and the like. The first substrate 10 is, for example, transparent substrate made of glass or plastic.

The second electrode 42 and the second substrate 20 may be transparent, partially-transparent or opaque, and their transparency is not limited herein. For simplifying the process, the second electrode 42 may also be made of at least one of the transparent conductive materials such as ITO, IZO and FTO, and the second substrate 20 may also be transparent plate made of glass or plastic.

In at least some of the embodiments, the pixel-separating wall 30 has a cofferdam-like structure arranged in grid form, such that the space between the first substrate 10 and the second substrate 20 is separated into a plurality of rectangular areas, thereby forming multiple cavities (i.e., sub-pixel regions 01a) between the first substrate 10 and the second substrate 10 in correspondence with the respective sub-pixels for accommodating the liquid used for the EWOD display.

As illustrated in FIG. 1, the pixel-separating walls 30 is, for example, against the surface of the black light-absorption layer 70; that is, the stacked layers including the hydrophobic dielectric layer 60 and the second electrode 42 are located within each sub-pixel region 01a. Alternatively, as illustrated in FIG. 2, the pixel-separating walls 30 on the periphery of the display panel 01 (i.e., the pixel-separating wall 30 at the rightmost side of FIG. 2) are, for example, against the surface of the black light-absorption layer 70, while the pixel-separating walls 30 corresponding to the sub-pixel regions 01a in the middle area of the display panel 01 are against the surface of the hydrophobic dielectric layer 60; that is, the hydrophobic dielectric layer 60 comprises portions that correspond to each sub-pixel region 01a and other portions that are located under the pixel-separating walls 30 and in direct contact with the pixel-separating walls 30. Similarly, the second electrode 42 further comprises portions that extend beneath the pixel-separating walls 30 to the middle area. In the structure illustrated in FIG. 2, since the second electrodes 42 of the adjacent sub-pixel region 01a are in contact with each other and their potential are identical, the intensity of electric field between the first electrode 41 and the second electrode 42 within each sub-pixel region 01a could be varied by adjusting the potential of the first electrode 41 within each sub-pixel region 01a.

The specific positions of the pixel-separating walls 30 is not limited in the embodiments of the present invention, as long as the pixel-separating walls 30 are arranged to be capable of separating the space between the first substrate 10 and the second substrate 20 into a plurality of independent cavities so that the electro-wetting liquid (transparent hydrophilic liquid and color ink) could be accommodated therein.

In at least some of the embodiments, for simplifying the process, as illustrated in FIG. 1 and FIG. 2, the black light-absorption layers 70 within each sub-pixel region 01a are connected to each other to form an integrated structure, such that the process of patterning the black light-absorption layer 70 could be omitted.

In at least some of the embodiments, the pixel-separating wall 30 is made of black light-absorption material so as to prevent the reflected light of the adjacent sub-pixel regions 01a from being mixed, thereby avoiding impacting the display effect. The black light-absorption material may include, for example, resin and black light-absorption particles (e.g., carbon black) dispersed in the resin.

When no electric field is applied between the first electrode 41 and the second electrode, as illustrated in FIG. 1 and FIG. 2, the second fluid layer 52 is able to spread over the surface of the hydrophobic dielectric layer 60 because the color ink has lipophilicity and hydrophobicity. The second fluid layer 52 completely covers the portion of the black light-absorption layer 70 that is located within the sub-pixel region 01a and the second fluid layer 52 has the largest spreading area. The ambient light from outside travels through the first substrate 10, the transparent first electrode 41 and the transparent first fluid layer 51 and then is reflected by the color ink (as illustrated by the dashed arrow in the drawings), and the second fluid layer 52 has the largest reflective area. Therefore, the sub-pixel region 01a is in its bright state in this case.

When an electric field is applied between the first electrode 41 and the second electrode 42, as illustrated in FIG. 3, (in the example of FIG. 3, a negative voltage is applied to the first electrode 41 and a positive voltage is applied to the second electrode 42, while in other embodiments a positive voltage may be applied to the first electrode 41 and a negative voltage may be applied to the second electrode 42), polarization charges are generated at the surface of the hydrophobic dielectric layer 60 due to the effect of the electric field. The generation of the polarization charges would enhance the affinity of the hydrophobic dielectric layer 60 with the polar aqueous solution (i.e., the hydrophilic liquid; the hydrophilic liquid is the transparent hydrophilic liquid in embodiments of the present invention). Accordingly, the contact angle of the transparent hydrophilic liquid on the hydrophobic dielectric layer 60 would decrease such that the transparent hydrophilic liquid become wet and spread over the hydrophobic dielectric layer 60. Meanwhile, the generation of the polarization charges would change the contact angle of the non-polar solution (i.e., hydrophobic solution; the hydrophobic solution is color ink in embodiments of the present invention. FIG. 3 only takes red ink R as example.) and increase the contact angle of the color ink on the hydrophobic dielectric layer 60, such that the color ink R contracts and thus the second fluid layer 52 aggregates and exposes the hydrophobic dielectric layer 60 which is disposed under the second fluid layer 52. In at least some of the embodiments, the hydrophilic liquid refers to the solvent containing polar group, such as hydroxyl or carbonyl group. The hydrophilic liquid has strong polarity and high dielectric constant, which includes, for example, water, formamide, trifluoroacetic acid, dimethyl sulfoxide (DMSO), acetonitrile, dimethyl formamide (DMF), hexamethyl phosphoramide, methanol, alcohol, acetic acid, isopropyl alcohol, acetone, tetrahydrofuran and the like.

In at least some of the embodiments, the hydrophobic dielectric layer is made of fluorine-containing resin which includes, for example, polytetrafluoroethylene (PTFE), fluorinated ethylene propylene (FEP) copolymer, poly perfluorinated alkoxy (PFA) resin, polytrifluorochloroethylene (PCTFE), ethylene vinyl chloride copolymer (ECTFE), ethylene fluoride (ETFE) copolymer, poly (vinylidene fluoride) (PVDF), polyvinyl fluoride (PVF) and the like.

It is noted that, the term "layer" in the first fluid layer 51 and the second fluid layer 52 described above is not used to define the geometrical shape of the fluid. And the term "layer" is not limited to the description of the spreading state. Since the second fluid layer 52 is made of light-reflecting color ink which is fluid and has flowability, after the color ink contracts on the surface of the hydrophobic dielectric layer 60 under the electric field, the shape of the layer would change accordingly from the spreading state under no electric field to the aggregating state. After the color ink contracts, the contact angle of the transparent hydrophilic liquid on the hydrophobic dielectric layer 60 is decreased and thus the transparent hydrophilic liquid is capable of wetting and spreading over the surface of the hydrophobic dielectric layer 60, so the form of the first fluid layer 51 also varies compared with its state under no electric field.

The form that color ink contracts and aggregates is not limited to the sphere as illustrated in FIG. 3, and may also be hemisphere. The specific form of the color ink after it contracts is related to the voltage difference between the first electrode 41 and the second electrode 42, and FIG. 3 only illustrated a exemplary form.

With the increasing of the voltage difference between the first electrode 41 and the second electrode 42, the color ink further contracts and aggregates accordingly, and the reflective area to the outside ambient light is becoming smaller and thus the pixel is becoming darker. Therefore, in at least some of the embodiments, full-color gray-scale display could be implemented by adjusting the voltage difference between the first electrode 41 and the second electrode 42 within the sub-pixel region 01a.

In the above display panel 01 provided in the embodiments of the present invention, the electro-wetting liquid within a sub-pixel region 01a comprises light-reflecting color ink (e.g., R/G/B color ink) with the same color as this sub-pixel region and transparent hydrophilic liquid. Through adjusting the voltage difference between the first electrode 41 and the second electrode 42 within each sub-pixel, the color ink within the sub-pixel could spread or contrast, so that the reflection intensity for the outside ambient light of the color ink with different color within different sub-pixel regions 01a could be controlled. Therefore, the display panel could display colorful images without an additional backlight source or color filter.

In at least some of the embodiments, the display panel comprises at least three colors of sub-pixel regions, for example, red, green and blue sub-pixel regions, or red, green, blue and white sub-pixel regions. The color ink within each sub-pixel region has the same color as the sub-pixel region.

In at least some of the embodiments, the color ink includes: a pigment particle with the same color as the color of the sub-pixel region, an organic solvent, and at least one of a metal sheet and a light-reflecting particle.

The first fluid layer 51 described above is made of transparent hydrophilic liquid (e.g., water), and the second fluid layer 52 is made of color ink, i.e., the second fluid layer 52 has hydrophobicity, which is opposite to the first fluid layer 51. In the color ink, the organic solvent serves to disperse fluid, so the hydrophobicity of the color ink depends on the organic solvent. The organic solvent, for example, has hydrophobicity.

The pigment particle may be, for example, red pigment particle (R), green pigment particle (G) or blue pigment particle (B). In at least some of the embodiments, the pigment particle further comprises white pigment particle or pigment particle of other color. The metal sheet may be made of aluminum or silver which has high reflectivity. The thickness of the metal sheet ranges from 10 nm to 500 nm. The size of the sheet in the sheet plane (i.e., the length and width of the sheet) ranges from 0.5 μm to 10 μm, which could be obtained, for example, by means of fine grinding. The light-reflecting particle may be made of aluminum or silver which has high reflectivity, or made of mirror glass which also has high reflectivity, and the particle size ranges from 0.2 μm to 2 μm.

When the above light-reflecting particle is made of metal, the color ink described above may be called metallic ink, because the metal sheet and/or metal light-reflecting particle have special metallic luster.

Since the light reflective effect of the pigment particle is relatively weak, it is difficult for the light reflected from it to meet the requirement for displaying color images. However, the metal sheets and/or light-reflecting particles have relatively small size and thus could stably suspend in the color ink, thereby increasing the ambient light directed to the surface of the pigment particles to increase the reflection of the pigment particles to the ambient light, and implementing color display with high light efficiency. Therefore, a reflective effect with high light efficiency could be implemented by cooperation of the light-reflecting effect of the metal sheets and/or light-reflecting particles and the light-reflecting effect of the pigment particles, thereby satisfying the requirement of the intensity of reflected light for color display.

In at least some of the embodiments, the color ink further comprises stabilizer, so that the pigment particles, the metal sheets and/or light-reflecting particles described above could be dispersed in the organic solvent stably and evenly, so as to increase the reflection uniformity to the outside ambient light.

Figure 4:
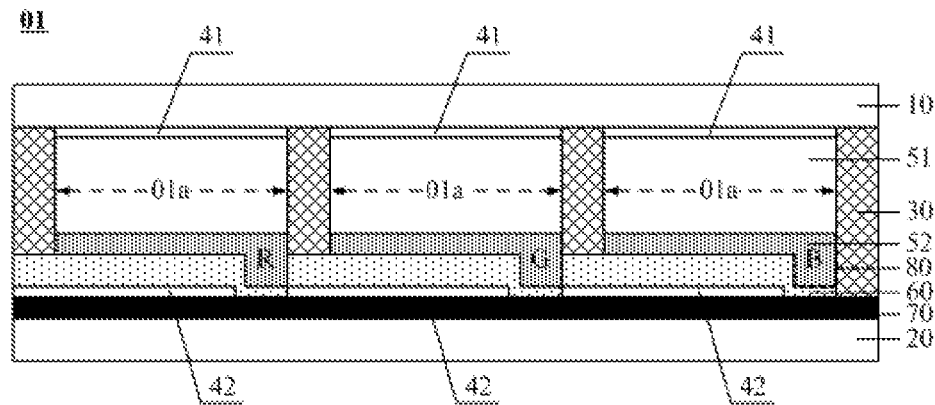
FIG. 4 schematically illustrates a partial cross-section of yet another display panel provided by an embodiment of the present invention.

In the aforementioned embodiments, when no electric field is applied between the first electrode 41 and the second electrode 42, the second fluid layer 52 spreads over the hydrophobic dielectric layer 60 which has a flat surface. When the electric field is applied between the first electrode 41 and the second electrode 42, the second fluid layer 52 would contract irregularly and the aggregation position is indeterminate, which may result in a crosstalk of reflected light from adjacent display areas 01a. Therefore, as illustrated in FIG. 4, in the above display panel provided in embodiments of the present invention, a reservoir 80 is configured for fixing the aggregation position of the contracting color ink, so as to make the second fluid layer 52 aggregate into a certain position and avoiding crosstalk of the reflected light from adjacent sub-pixel regions 01*a*. Additionally, the second fluid layer 52 can contract to its smallest volume by adjusting the reservoir capacity of the reservoir, so as to make the dark state of the sub-pixel darker, thereby further increasing the contrast of the display.

Embodiments of the present invention provide two examples of reservoirs 80.

Example 1

Figure 5:
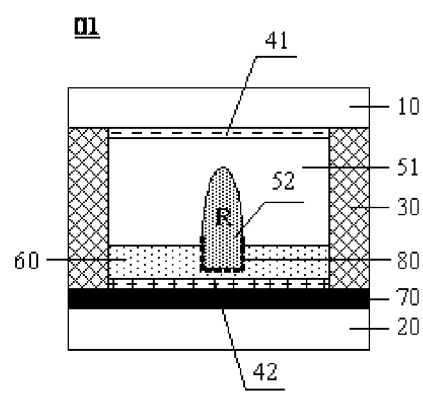
FIG. 5 schematically illustrates a reservoir of a display panel provided by an embodiment of the present invention.

As illustrated in FIG. 5, the hydrophobic dielectric layer 60 within at least one sub-pixel region 01*a* is provided with a reservoir 80 (as indicated by dashed line), so that the second fluid layer 52 contracts and aggregates within the reservoir 80 under the effect of the electric field. The position of the reservoir 80 may be positioned at the center of the sub-pixel region 01*a*, or other position such as at the periphery of the sub-pixel region 01*a*.

In order to avoid the crosstalk of reflected light from adjacent sub-pixel regions 01*a*, the reservoir 80 described above is provided, for example, in the hydrophobic dielectric layer 60 within each sub-pixel region 01*a*.

Embodiment 2

Figure 6:
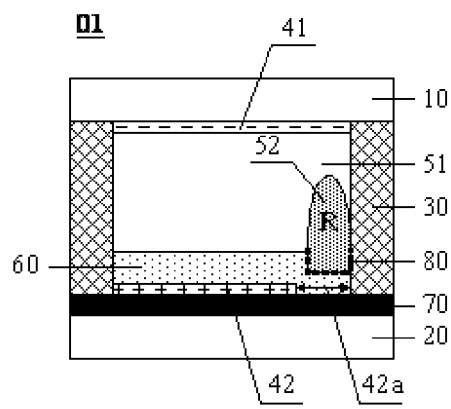
FIG. 6 schematically illustrates a reservoir of another display panel provided by an embodiment of the present invention.

In order to facilitate the aggregation of the second fluid layer, as illustrated in FIG. 6, the second electrode 42 within at least one sub-pixel region 01*a* is provided with an opening 42*a*, and the hydrophobic dielectric layer 60 is provided with a reservoir 80 at a position corresponding to the position of the opening 42*a*. The second electrode 42 has no overlap with the reservoir 80.

When the opening 42*a* is formed at the center of the second electrode 42, the opening 42*a* is equivalent to a through-hole, and the reservoir 80 of the hydrophobic dielectric layer 60 is also positioned at the center of the sub-pixel region 01*a*. When the opening 42*a* is formed at the periphery of the second electrode 42, the opening 42*a* is equivalent to a notch, and the reservoir 80 of the hydrophobic dielectric layer 60 is also positioned at the periphery of the sub-pixel region 01*a* adjacent to the pixel-separating wall 30.

It is noted that, when the hydrophobic dielectric layer 60 has a relatively small thickness, only the opening 42*a* is formed in the second electrode 42. In this way, when the hydrophobic dielectric layer is formed on and spread over the second electrode 42, a concave reservoir 80 is formed at the position corresponding to the opening 42*a* of the second electrode 42.

When the hydrophobic dielectric layer 60 has a relatively large thickness, it may not sufficient to only form the opening 42*a* in the second electrode 42 for the purpose of enabling the hydrophobic dielectric layer 60 subsequently formed to form a concave at the position corresponding to the opening 42*a* of the second electrode 42, so an additional reservoir 80 is further disposed in the hydrophobic dielectric layer 60.

In the case that the reservoir 80 is located in the middle of the sub-pixel region 01*a* (e.g., at the center of the sub-pixel region 01*a*), the second fluid layer 52 that contracts and aggregates could still reflect the ambient light from all directions and thus the dark extent of the dark state is relatively low. Therefore, as an example, within the sub-pixel region 01*a*, the reservoir 80 is located proximal to one side of the pixel-separating wall 30. Since the pixel-separating wall 30 could block light and reduce the ambient light directed to the surface of the second fluid layer 52 that contracts and aggregates, the dark extent of the dark state of the sub-pixel region is relatively high.

In one embodiment, each of the sub-pixel region 01*a* has the reservoir 80 arranged therein, and the reservoir 80 is arranged in the same position of each sub-pixel region 01*a*, such that the dark state of each sub-pixel region 01*a* is evenly distributed.

Figure 7:
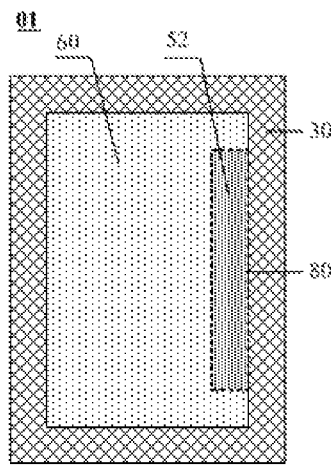
FIG. 7 is a partial top view of a display panel provided by an embodiment of the present invention.

The specific shape of the reservoir is not limited in embodiment of the present invention. The shape of the reservoir in the plane of the display panel may be irregular or regular shape, such as rectangle, circle. In order to prevent the second fluid layer 52 that contracts and aggregates from being exposed to the ambient light, as illustrated in FIG. 7, the shape of cross-section of the reservoir 80 in the plane of the display panel 01 may be for example rectangle. As a result, the color ink that makes up of the second fluid layer 52 could aggregate into a strip proximal to the pixel-separating wall 30, thereby reducing the contact between the ambient light and the second fluid layer 52. As illustrated in FIG. 7, the reservoir 80 is in contact with the pixel-separating wall 30 at its one side, that is, the length (in the vertical direction) of the reservoir 80 is less than the length of the sub-pixel region 01*a*.

In other embodiments, the reservoir 80 may extend to the periphery of the pixel-separating wall 30, i.e., the reservoir 80 is in contact with the pixel-separating wall 30 at its three sides. That is to say, the length of the reservoir 80 is equal to the length of the sub-pixel region 01*a*.

The length and width of the above reservoir 80 are determined with reference to the size of the sub-pixel, i.e., the sub-pixel region 01*a*, so that the opening of the reservoir 80 may have a corresponding size matching with the size of the sub-pixel. Therefore, the size of light-reflecting area of the color ink is in proportion to the size of the sub-pixel region 01*a*, and the display quality is increased. For example, the length (in vertical direction) of the reservoir 80 is 1/10 to 1/4 of the length of the sub-pixel region 01*a*, and the width (in horizontal direction) of the reservoir 80 is 1/10 to 1/4 of the width of the sub-pixel region 01*a*. In order to accommodating the color ink that makes up of the second fluid layer 52 as much as possible in the reservoir 80 to reduce the reflection of the contracting color ink to the ambient light, the depth (as illustrated in FIG. 5 and FIG. 6) of the reservoir 80 ranges, for example, from 2 μm to 20 μm.

In one embodiment, both the length and the width of the reservoir 80 range from 2 μm to 20 μm, so that the reservoir 80 could be suitable for the pixel unit and the display panel with larger size. The above length, width and depth of the reservoir 80 enable its concave surface to accommodate as much color ink as possible, and make the color ink stored within the reservoir 80 stably.

In at least some of the embodiments, a light shielding layer 90 is arranged above the reservoir 80 serving for shielding so as to prevent the color ink that makes up of the second fluid layer 52 from being exposed to ambient light after the color ink contracts and aggregates. As a result, the sub-pixel region is in complete dark state (i.e., complete black) and thus the contrast is further increased.

Embodiments of the present invention provide two examples of the light shielding layers 90.

Example 1

Figure 8:
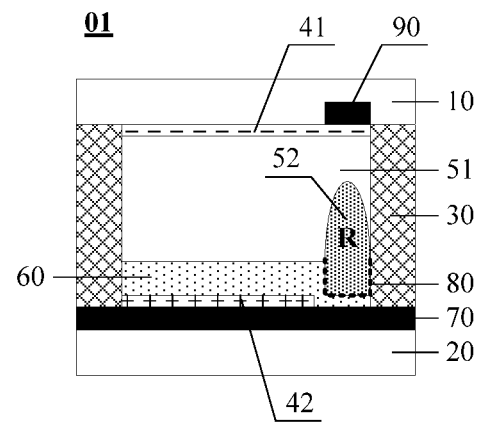
FIG. 8 schematically illustrates a light shielding layer in a display panel provided by an embodiment of the present invention.

As illustrated in FIG. 8, the light shielding layer 90 is, for example, a black matrix which is arranged on the surface of the first substrate 10 that faces to the second substrate 20, i.e., arranged on one side of the first electrode 41 that is adjacent to the first substrate 10, and located at a position that corresponds to the reservoir 80 in vertical direction; alternatively, the light shielding layer 90 may also be arranged on the surface of the first electrode 41 that faces to the second substrate 20 (not illustrated in FIG. 8). The surface of the light shielding layer 90 is flush with the surface of the first substrate 10 and in contact with the first electrode 41.

Example 2

Figure 9:
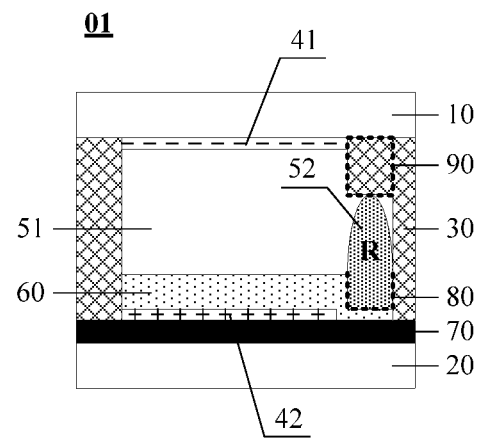
FIG. 9 schematically illustrates a light shielding layer in another display panel provided by an embodiment of the present invention.

As illustrated in FIG. 9, when the reservoir 80 is arranged adjacent to one side of the pixel-separating wall 30, the light shielding layer 90 may be a convex portion horizontally extended from the pixel-separating wall, so that the surface of the color ink is prevented from the ambient light by the convex portion of the pixel-separating wall.

What is described above is related to the illustrative embodiments of the disclosure only and not limitative to the scope of the disclosure; the scopes of the disclosure are defined by the accompanying claims.

The present application claims the priority of Chinese patent application No. 201610055837.5 filed on Jan. 27, 2016, the disclosure of which is incorporated herein by reference in its entirety.

The invention claimed is:

1. A display panel, comprising a first substrate and a second substrate which are arranged opposed to each other, wherein a space between the first substrate and the second substrate is separated into a plurality of sub-pixel regions;
   wherein a first electrode, a first fluid layer, a second fluid layer, a hydrophobic dielectric layer and a second electrode are arranged in this order within each sub-pixel region;
   wherein the first fluid layer is made of hydrophilic liquid; the second fluid layer is made of ink; when no electric field is applied between the first electrode and the second electrode, the ink spreads over a surface of the hydrophobic dielectric layer; when the electric field is applied between the first electrode and the second electrode, the ink aggregates to expose the hydrophobic dielectric layer, and
   wherein the hydrophobic dielectric layer within at least one sub-pixel region is provided with a reservoir which is configured to reserve the ink, and the reservoir is a groove formed in the hydrophobic dielectric layer.

2. The display panel of claim 1, wherein the second electrode within the at least one sub-pixel region is provided with an opening, the reservoir is arranged over the opening.

3. The display panel of claim 1, wherein the second electrode has no overlap with the reservoir.

4. The display panel of claim 1, wherein the ink aggregates into the reservoir under effect of the electric field.

5. The display panel of claim 1, wherein a light shielding layer is provided above the reservoir and shields for the reservoir.

6. The display panel of claim 5, wherein the light shielding layer is formed on the first substrate, and the surface of the light shielding layer is flush with the surface of the first substrate and in contact with the first electrode.

7. The display panel of claim 1, further comprising a pixel-separating wall arranged between the first substrate and the second substrate for separating adjacent sub-pixel regions, wherein the reservoir is arranged proximal to one side of the pixel-separating wall.

8. The display panel of claim 7, wherein the pixel-separating wall comprises a convex portion that extends horizontally, the convex portion is located above the reservoir for shielding the light from irradiating the reservoir.

9. The display panel of claim 1, a shape of a cross section of the reservoir in a plane of the display panel is rectangle.

10. The display panel of claim 9, wherein
    a length of the reservoir is 1/10 to 1/4 of a length of the sub-pixel region;
    a width of the reservoir is 1/10 to 1/4 of a width of the sub-pixel region; and
    a depth of the reservoir ranges from 2 μm to 20 μm.

11. The display panel of claim 1, comprising at least three colors of sub-pixel regions, wherein the ink in each sub-pixel has the same color as the sub-pixel region.

12. The display panel of claim 1, wherein the ink comprises:
    a pigment particle, an organic solvent, and at least one of a metal sheet and a light-reflecting particle.

13. The display panel of claim 12, wherein,
    a thickness of the metal sheet ranges from 10 nm to 500 nm; and
    a length and a width in sheet plane of the metal sheet both range from 0.5 μm to 10 μm.

14. The display panel of claim 12, wherein a size of the light-reflecting particle ranges from 0.2 μm to 2 μm.

15. The display panel of claim 1, wherein each of the sub-pixel regions further comprises a black light-absorption layer arranged between the second substrate and the second electrode.

16. The display panel of claim 15, wherein the black light-absorption layer within a plurality of sub-pixel regions are connected to each other to form an integrated layer.

17. The display panel of claim 1, wherein the first substrate is made of transparent material.

18. The display panel of claim 1, wherein the first electrode is made of transparent conductive material.

19. The display panel of claim 1, wherein the hydrophilic liquid is transparent.

* * * * *